US010562758B2

United States Patent
Ham et al.

(10) Patent No.: US 10,562,758 B2
(45) Date of Patent: Feb. 18, 2020

(54) VALVE APPARATUS OF UREA TANK FOR VEHICLE

(71) Applicant: HYUNDAI MOTOR COMPANY, Seoul (KR)

(72) Inventors: Chang Ho Ham, Ansan-si (KR); Eun Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 15/372,874

(22) Filed: Dec. 8, 2016

(65) Prior Publication Data

US 2018/0111820 A1    Apr. 26, 2018

(30) Foreign Application Priority Data

Oct. 21, 2016 (KR) .......................... 10-2016-0137946

(51) Int. Cl.
*B67D 7/32* (2010.01)
*B67D 7/00* (2010.01)
*F01N 3/20* (2006.01)
*F01N 3/28* (2006.01)

(52) U.S. Cl.
CPC ............ *B67D 7/3281* (2013.01); *B67D 7/002* (2013.01); *F01N 3/2066* (2013.01); *F01N 3/2896* (2013.01); *F01N 2610/02* (2013.01); *F01N 2610/1406* (2013.01); *F01N 2610/1486* (2013.01)

(58) Field of Classification Search
CPC ... B64D 37/20; F01N 2610/1406; F01N 3/28; F01N 3/2896; F16K 31/34; B67D 7/002; B67D 7/3281

USPC ......................................................... 137/592
See application file for complete search history.

(56) References Cited

U.S. PATENT DOCUMENTS

| | | | | |
|---|---|---|---|---|
| 3,145,727 A | * | 8/1964 | Yamashita | .............. E03B 5/025 |
| | | | | 137/413 |
| 6,035,888 A | * | 3/2000 | Gil | .......................... F16K 31/34 |
| | | | | 137/413 |
| 6,807,952 B1 | * | 10/2004 | Amellal | ............. B01D 35/0273 |
| | | | | 123/516 |

(Continued)

FOREIGN PATENT DOCUMENTS

| | | |
|---|---|---|
| JP | 6-75852 A | 3/1994 |
| KR | 20-0360747 Y1 | 9/2004 |

(Continued)

*Primary Examiner* — Craig M Schneider
*Assistant Examiner* — Angelisa L. Hicks
(74) *Attorney, Agent, or Firm* — Knobbe Martens Olson & Bear LLP (57) ABSTRACT

Disclosed is a valve apparatus of a urea tank for a vehicle, the valve apparatus configured such that a urea solution injection pipe is flexibly bent and has a float so that a urea injection valve provided at the urea solution injection pipe is prevented from being immersed in the urea solution in the urea tank. Thus, the urea solution can be prevented from being damaged upon freezing in a winter season. Further, when a urea solution is injected, the urea solution injection pipe is straightened by flow pressure of the urea solution such that the float is forced to be immersed in the urea solution in the urea tank, and accordingly the urea solution injection valve is immersed therein. Thus, the urea solution can be efficiently injected into the urea tank.

7 Claims, 6 Drawing Sheets

(56) References Cited

U.S. PATENT DOCUMENTS

| | | | |
|---|---|---|---|
| 7,748,402 B2* | 7/2010 | Chan | F16K 1/303 137/422 |
| 2001/0054615 A1* | 12/2001 | Krogull | B60K 15/04 220/86.2 |
| 2002/0000248 A1* | 1/2002 | Herlihy | F16K 31/34 137/413 |
| 2004/0050428 A1* | 3/2004 | Benjey | B60K 15/04 137/592 |
| 2015/0114505 A1* | 4/2015 | Ryu | F01N 3/206 137/899 |

FOREIGN PATENT DOCUMENTS

| | | |
|---|---|---|
| KR | 10-1504892 B1 | 3/2015 |
| KR | 10-1556919 B1 | 10/2015 |
| KR | 10-1608589 B1 | 4/2016 |
| KR | 10-1610531 B1 | 4/2016 |

\* cited by examiner

VALVE APPARATUS OF UREA TANK FOR VEHICLE

CROSS REFERENCE TO RELATED APPLICATION

The present application claims priority to Korean Patent Application No. 10-2016-0137946, filed Oct. 21, 2016, the entire contents of which is incorporated herein for all purposes by this reference.

BACKGROUND

Field

The present disclosure relates generally to a valve apparatus of a urea tank for a vehicle

Description of the Related Art

In recent years, as environmental issues have become more important, various types of post-treatment apparatuses for reducing harmful substances, such as NOx, CO, and particulate matter (PM), etc., that are contained in exhaust gas, have been employed in accordance with exhaust gas regulations.

Generally, such a post-treatment apparatus includes a Diesel Oxidation Catalyst (DOC) installed adjacent to an engine and performs conversion of non-methane hydrocarbon, a Diesel Particulate Filter (DPF) capturing particulate matter, and a Selective Catalytic Reduction (SCR) catalyst purifying NOx through a reduction action.

In particular, in the case of the SCR catalyst, when a urea solution is injected into a dosing module that is disposed at a front end thereof to maintain NOx purification performance at a predetermined level or more, the urea solution is pyrolyzed by heat of the exhaust gas, and the SCR catalyst adsorbs ammonia ($NH_3$) generated by hydrolysis with the SCR catalyst, and then adsorbed ammonia reacts with NOx for purification.

The disclosure of this section is to provide background of the invention. Applicant notes that this section may contain information available before this application. However, by providing this section, Applicant does not admit that any information contained in this section constitutes prior art.

SUMMARY

One aspect of the invention provides a valve apparatus of a urea tank of for a vehicle in which an ICV valve is immersed in a urea solution during injection of the urea solution, and the ICV valve is prevented from being immersed in the urea solution in the urea tank after injection of the urea solution is completed.

Another aspect of the present invention provides an element and a valve apparatus of a urea tank for a vehicle, the valve apparatus including: a casing storing a urea solution therein; a urea solution injection pipe extending inside the casing while passing therethrough, the urea solution injection pipe configured to be flexibly bent, and provided at an end thereof with a urea solution injection valve; and a float mounted to the urea solution injection pipe, and preventing the urea solution injection valve from being immersed in the urea solution by allowing the urea solution injection pipe to be lifted and bent by buoyancy acting thereon by the urea solution in the casing.

The urea solution injection pipe may include: a first extension part extending inside the casing while passing therethrough; a connection part connected to an end of the first extension part, and configured to be flexibly bent; and a second extension part connected to the connection part, and provided with the urea solution injection valve and the float adjacent to the urea solution injection valve.

The first extension part may be installed on the casing such that the first extension part may pass through an upper part of the casing and extends at a predetermined angle of inclination toward a lower part of the casing, and the predetermined angle of inclination is fixed.

The connection part may be made of a flexibly deformable material and may have a plurality of wrinkles.

The second extension part may be connected to the connection part at a first end thereof, and may be provided with the urea solution injection valve at a second end thereof, with the float provided at a lower side of the urea solution injection valve.

The float may include: a fixing part fixed to the urea solution injection pipe; and an air ball extending downwards from the fixing part to be placed at a lower side of the urea solution injection valve, and being hermetically sealed and having air therein.

The urea solution injection valve may include: a valve housing mounted to an end of the urea solution injection pipe; and a door part provided at an opening of the valve housing so as to normally close the opening of the valve housing, and connected to an elastic spring so as to be elastically biased in a direction closing the opening of the valve housing.

The urea solution injection valve may include: a valve casing mounted at an inlet part thereof to an end of the urea solution injection pipe, and configured such that an outlet part of the valve casing is circumferentially opened; and a stopper provided at the outlet part of the valve casing so as to normally close the outlet part of the valve casing by being elastically biased by a restoring spring, and to open the outlet part of the valve casing when being forced by injection pressure of the urea solution.

The outlet part of the valve casing may be closed at an end thereof and may be provided with a plurality of holes formed on a circumferential surface thereof at regular intervals.

The stopper provided at the outlet part of the valve casing may be configured as a conical shape and is installed such that a conical surface thereof is directed towards the inlet part of the valve casing.

According to the valve apparatus of the urea tank for the vehicle with the above-described configuration, the urea solution injection pipe is flexibly bent, with the float mounted thereto so that the urea solution injection valve is prevented from being immersed in the urea solution in the urea tank. Thus, the configuration according to embodiments of the present invention can prevent the urea solution valve from being damaged upon freezing of the urea solution in a winter season.

In addition, when a urea solution is injected, the urea solution injection pipe is straightened by flow pressure of the urea solution such that the float is forced to be immersed in the urea solution in the urea tank, and accordingly the urea solution injection valve is immersed therein. Thus, according to embodiments of the present invention, the urea solution can be efficiently injected into the urea tank.

BRIEF DESCRIPTION OF THE DRAWINGS

The above and other features and advantages of the present invention will be more clearly understood from the following detailed description when taken in conjunction with the accompanying drawings, in which:

FIG. 1 is a view illustrating a valve apparatus of a urea tank for a vehicle according to an embodiment of the present invention.

DETAILED DESCRIPTION OF EMBODIMENTS

Hereinbelow, embodiments of the present invention will be described in detail with reference to the accompanying drawings. Throughout the drawings, the same reference numerals will refer to the same or like parts.

Urea solution is stored in a urea tank at which a filler neck for injecting the urea solution into the urea tank is provided. The filler neck is provided with an inlet check valve (ICV) so that the ICV is normally closed, whereas when the urea solution is injected, the ICV is opened to fill the urea tank with the urea solution.

The urea solution may be frozen like water at low temperature. When the urea solution is frozen in the state where the ICV valve is immersed in the urea solution in the urea tank in a winter season where the temperature is low, there is a risk that the ICV valve is damaged by volume expansion of the urea solution.

In order to avoid damage of the ICV valve, the ICV valve is inhibited from being immersed in the urea solution in the urea tank. However, during loading the urea solution, to avoid overfilling of the urea solution the ICV valve is immersed into the urea solution.

Figure 1:
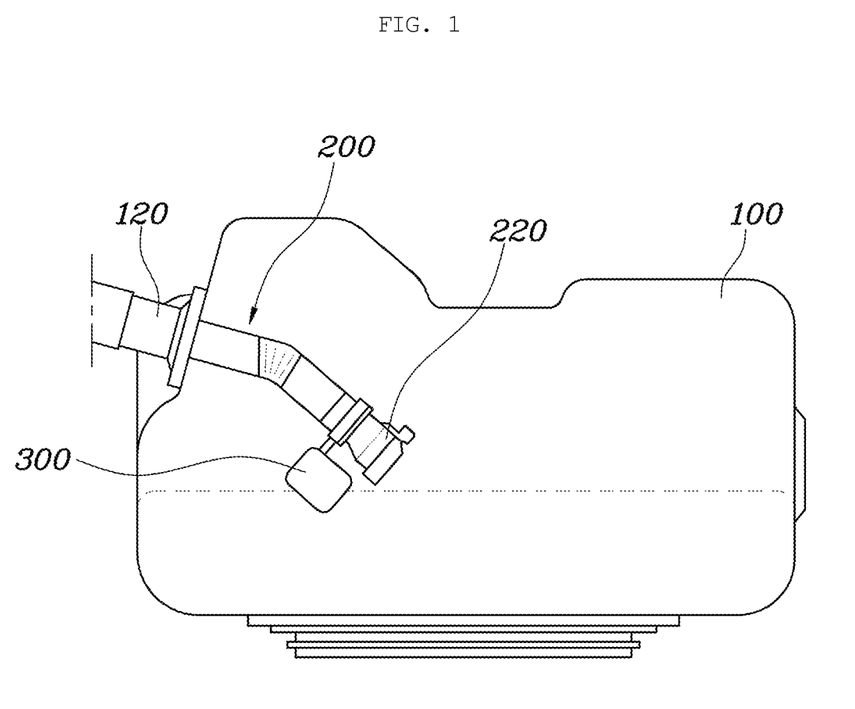
Figure 2:
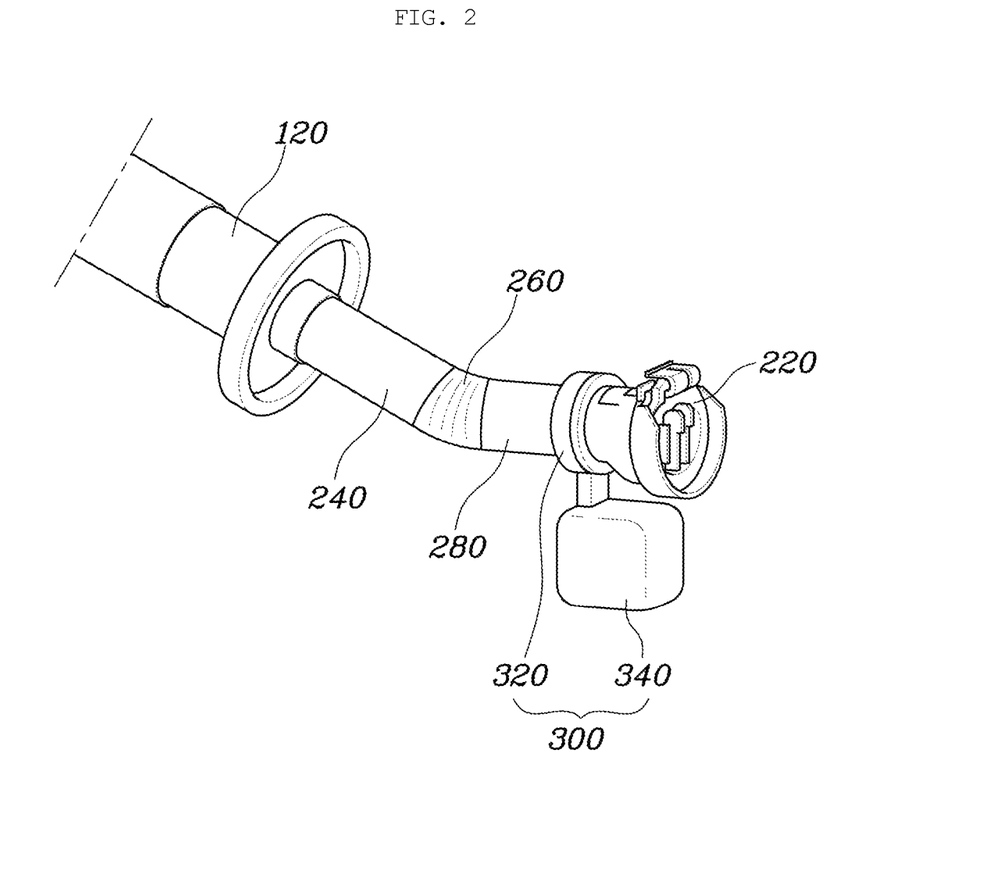
FIG. 2 is a view illustrating a urea solution injection pipe and a float of the valve apparatus of the urea tank for the vehicle shown in FIG. 1.
Figure 3:
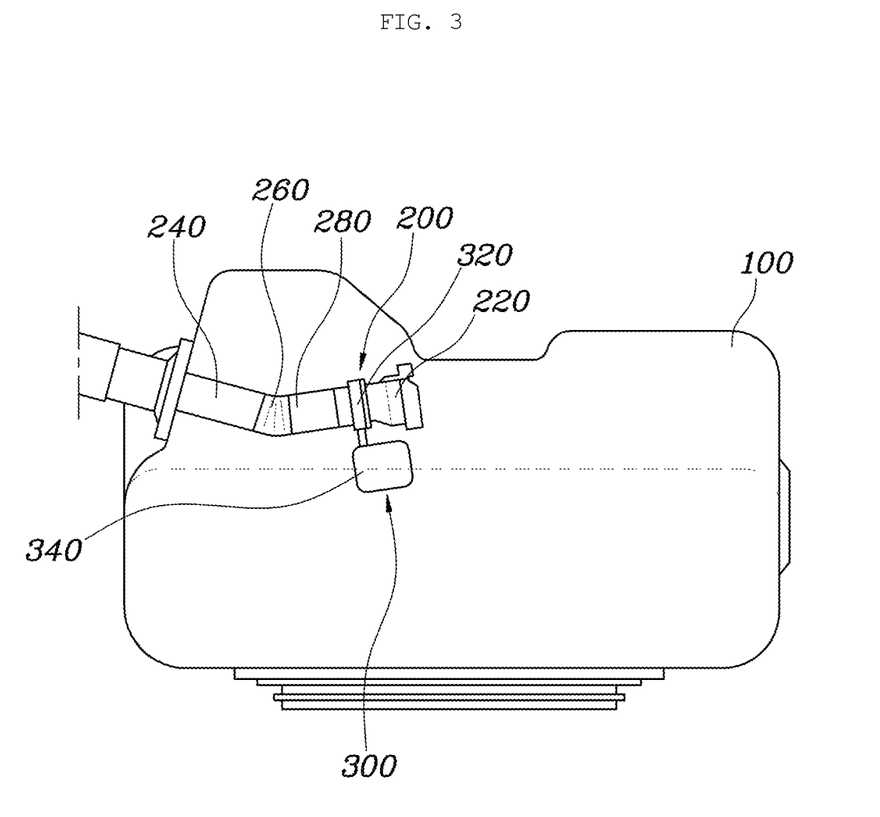
FIGS. 3 to 4 are views for explaining the valve apparatus of the urea tank for the vehicle shown in FIG. 1.
Figure 4:
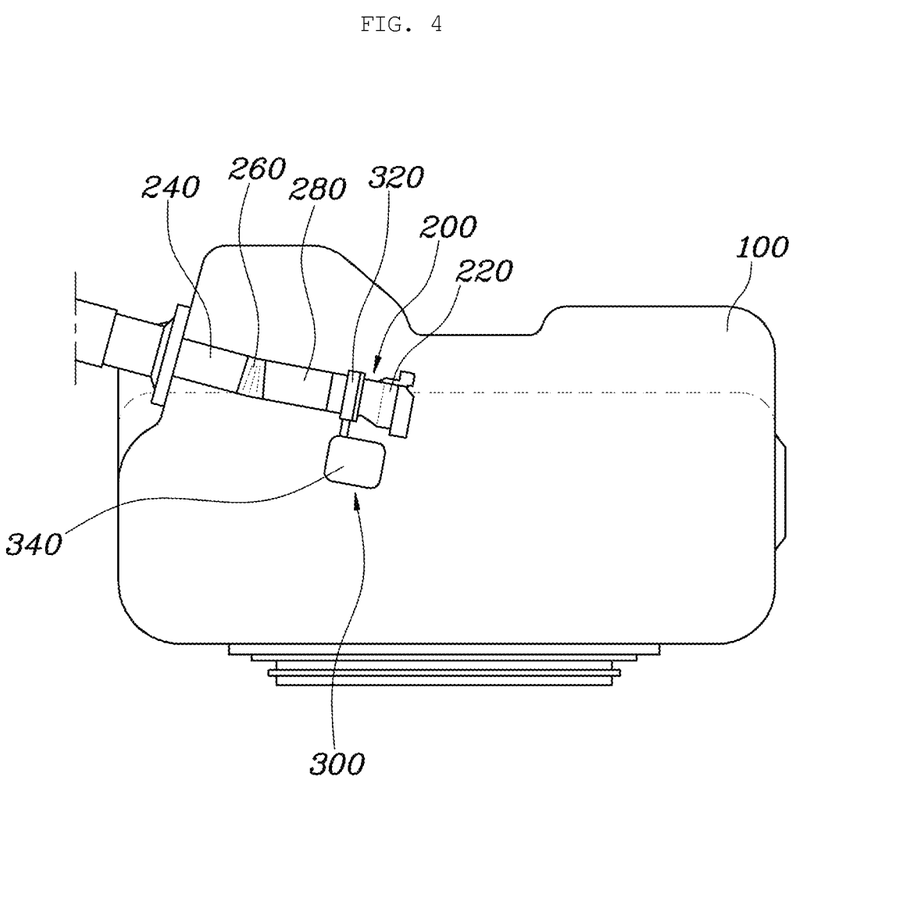
Figure 5:
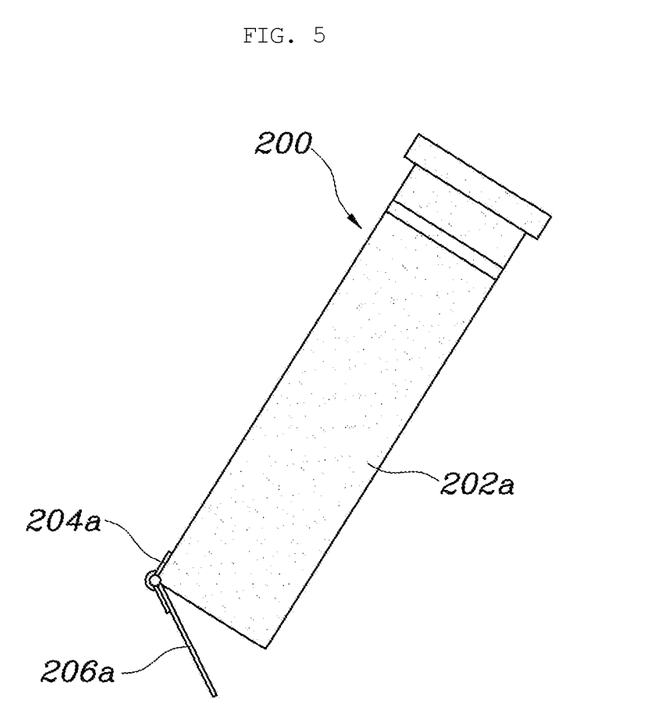
FIG. 5 is a view illustrating a first embodiment of a urea solution injection valve according to the valve apparatus of the urea tank for the vehicle shown in FIG. 1.
Figure 6:
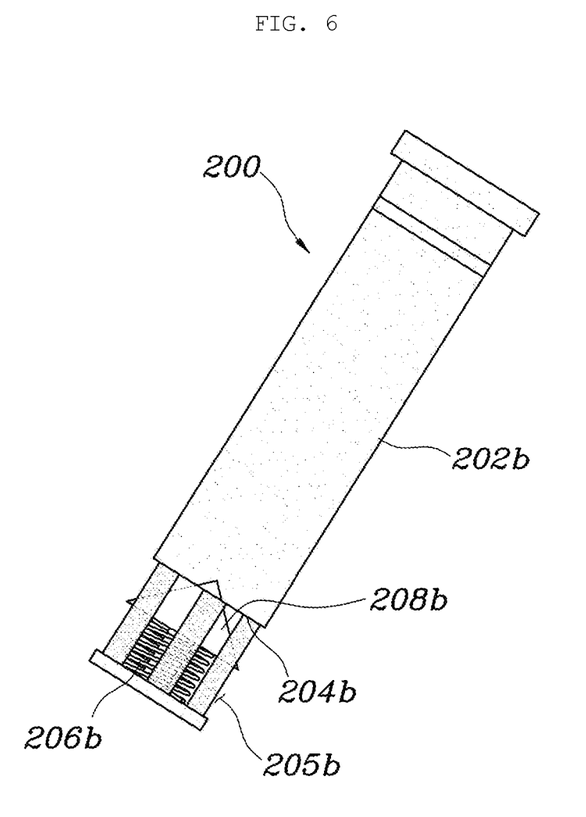
FIG. 6 is a view illustrating a second embodiment of a urea solution injection valve according to the valve apparatus of the urea tank for the vehicle shown in FIG. 1.

FIG. 1 is a view illustrating a valve apparatus of a urea tank for a vehicle according to an embodiment of the present invention; FIG. 2 is a view illustrating a urea solution injection pipe and a float of the valve apparatus of the urea tank for the vehicle shown in FIG. 1; FIGS. 3 to 4 are views for explaining the valve apparatus of the urea tank for the vehicle shown in FIG. 1; FIG. 5 is a view illustrating a first embodiment of a urea solution injection valve according to the valve apparatus of the urea tank for the vehicle shown in FIG. 1; and FIG. 6 is a view illustrating a second embodiment of a urea solution injection valve according to the valve apparatus of the urea tank for the vehicle shown in FIG. 1.

With reference to FIG. 1, a valve apparatus of a urea tank for a vehicle according to embodiments of the present invention includes: a casing or housing 100 storing a urea solution therein; a urea solution injection pipe 200 extending inside the casing while passing therethrough, the urea solution injection pipe 220 configured to be flexibly bent, and provided at an end thereof with a urea solution injection valve 220; and a float device 300 mounted to the urea solution injection pipe 200, and preventing the urea solution injection valve 220 from being immersed in the urea solution by allowing the urea solution injection pipe 200 to be lifted and bent by buoyancy acting thereon by the urea solution in the casing 100.

As such, the apparatus according to embodiments of the present invention is configured with the casing 100, the urea solution injection pipe 200, and the float device 300. The casing 100 is provided to store the urea solution therein and the urea solution injection pipe 200 is provided to inject the urea solution into the casing 100.

In particular, the urea solution injection pipe 200 is configured to be flexibly bent and the float device 300 is mounted thereto. With reference to FIG. 3, the float device 300 is lifted by buoyancy acting thereon by the urea solution stored in the casing 100 such that the urea solution injection pipe 200 is bent in accordance with a movement of the float device 300. Thus, the urea solution injection valve 200 is prevented from being immersed in the urea solution stored in the casing 100. In such a manner, the urea solution injection valve 220 provided in the urea solution injection pipe 200 maintains a state of being lifted above the surface of the urea solution stored in the casing 100. Thus, the urea solution injection valve 220 can be prevented from being damaged upon volume expansion caused by the urea solution freezing at low temperature in a winter season.

In addition, with reference to FIG. 4, when the urea solution is injected into the casing 100 through the urea solution injection pipe 200, the urea solution injection pipe 200 is flexibly bent to be straightened by flow pressure of the urea solution. Here, the float device 300 mounted to the urea solution injection pipe 200 is also forced by flow pressure of the urea solution to be immersed in the urea solution stored in the casing 100, and accordingly the urea solution injection pipe 220 is immersed in the urea solution stored in the casing 100. Thus, the urea solution introduced through the urea solution injection valve 220 can be efficiently supplied into the urea solution stored in the casing 100.

Accordingly, in embodiments of the present invention, the urea solution injection valve 220 is normally maintained in a lifted state above the surface of the urea solution stored in the casing 100 so that the urea solution injection valve 220 can be prevented from being damaged upon freezing of the urea solution. On the other hand, when the urea solution is injected, the urea solution injection valve 220 is immersed in the urea solution stored in the casing 100, and thus it is possible to efficiently inject the urea solution.

In embodiments of the present invention, with reference to FIG. 2, the urea solution injection pipe 200 includes: a first extension part 240 extending inside the casing while passing therethrough; a connection part 260 connected to an end of the first extension part 240, and configured to be flexibly bent; and a second extension part 280 connected to the connection part 260, and provided with the urea solution injection valve 220 and the float device 300 adjacent to the urea solution injection valve 220.

As such, the urea solution injection pipe 200 is configured with the first extension part 240, the connection part 260, and the second extension part 280. Here, the first extension part 240 extends inside the casing 100 while passing therethrough and is fixedly installed on the casing 100. Here, the first extension part 240 is mounted to the casing 100 through a filler neck 120 provided outside the casing 100 to have a stable installation structure.

In embodiments, the first extension part 240 may be installed on the casing 100 such that the first extension part 240 passes through an upper part of the casing 100 and extends at a predetermined angle of inclination towards a lower part of the casing 100, the predetermined angle of inclination being fixed. In such a manner, the first extension part 240 is fixedly installed on the upper part of the casing 100 with the predetermined angle of inclination, such that the urea solution is efficiently introduced inside the casing 100 through the first extension part 240 to meet the predetermined angle of inclination. Moreover, when the urea solution is injected, the connection part 260 and the second extension part 280 are straightened by flow pressure of the urea solution in such a manner that the urea solution injection valve 220 can be immersed in the urea solution stored in the casing 100. Here, circumferential surfaces of the first and second extension parts 240 and 280 may be provided with an elastic body such that when the urea solution is injected, the connection part 260 is straightened without being rotated when the float device 300 is lifted by buoyancy acting thereon by urea solution in the casing 100. Accordingly, the urea solution injection valve 220 can be guided to be efficiently immersed in the urea solution stored in the casing 100. The elastic body may be a leaf spring.

Meanwhile, the connection part 260 may be made of a flexibly deformable material and may have a plurality of wrinkles. The connection part 260 may be made of a rubber material and may have a plurality of circumferential wrinkles, so the connection part 260 can be easily bent and deformed at a desired angle.

Meanwhile, the second extension part 280 may be connected to the connection part 260 at a first end thereof, and is provided with the urea solution injection valve 220 at a second end thereof, with the float device 300 provided at a lower side of the urea solution injection valve 220. In other words, the second extension part 280 is connected to the connection part 260 at the first end thereof such that an installation angle thereof may be changed due to deformation of the connection part 260. Further, the second extension part 280 is provided with the urea solution injection valve 220 at the second end thereof so that the urea solution introduced through the first extension part 240 and the connection part 260 can be discharged inside the casing 100 through the urea solution injection valve 220.

In particular, the second extension part 280 is provided with the float device 300. Here, the float device 300 is placed at the lower side of the urea solution injection valve 220 such that when the float device 300 is lifted above the surface of the urea solution by buoyancy acting thereon by the urea solution stored in the casing 100, the urea solution injection valve 220 is lifted above the surface of the urea solution in accordance with the movement of the float device 300 so as not to be immersed in the urea solution stored in the casing 100.

As such, the urea solution injection pipe 200 is configured with the first extension part 240, the connection part 260, and the second extension part 280 such that when the float device 300 provided at the second extension part 280 is lifted by buoyancy acting thereon by the urea solution stored in the casing 100, the connection part 260 is bent in accordance with the movement of the float device 300 in such a manner that the urea solution injection valve 220 can be maintained so as not to be immersed in the urea solution stored in the casing 100. Further, when the urea solution is injected, the connection part 260 and the second extension part 280 are straightened by flow pressure of the urea solution injected through the first extension part 240 to meet the predetermined angle of inclination of the first extension part 240. Thus, the urea solution can be efficiently injected into the casing 10.

Meanwhile, with reference to FIG. 2, the float device 300 includes: a fixing part 320 fixed to the urea solution injection pipe; and an air ball 340 extending downwards from the fixing part 320 to be placed at a lower side of the urea solution injection valve 220, and being hermetically sealed and having air therein.

As such, the float device 300 is configured with the fixing part 320 and the air ball 340. The fixing part 320 is configured to surround the urea solution injection pipe 200 and is fixedly installed on the urea solution injection pipe 200. The air ball 340 is provided at the lower side of the fixing part 320, and is hermetically sealed and has air therein so that the float device 300 can be lifted above the surface of the urea solution stored in the casing 100. Accordingly, the float device 300 is provided such that the urea solution injection pipe 200 is lifted by buoyancy acting thereon by the urea solution stored in the casing 100 so as to prevent the urea solution injection valve 220 from being immersed in the urea solution stored in the casing 100.

However, in embodiments of the present invention, when the urea solution is injected through the urea solution injection pipe 200, the float device 300 is immersed in the urea solution stored in the casing 100 by flow pressure of the urea solution. For this, a size of the air ball 340 is determined considering this requirement.

Meanwhile, with reference to FIG. 5, the urea solution injection valve 220 includes: a valve housing 202*a* mounted to an end of the urea solution injection pipe 200; and a door part 206*a* provided at an opening of the valve housing 202*a* so as to normally close the opening of the valve housing 202*a*, and connected to an elastic spring 204*a* so as to be elastically biased in a direction closing the opening of the valve housing 202*a*.

This is a first embodiment of the urea solution inlet valve 220. The valve housing 202*a* fixed to the end of the urea solution inlet 200 is provided with door part 206*a* resiliently supported in the direction closing the opening of the valve housing 202*a* by the elastic spring 204*a* in such a manner that the door part 206*a* normally closes the opening of the valve housing 202*a* by elastic force of the elastic spring 204*a*, and when the urea solution is injected through the urea solution injection pipe 200, the door part 206*a* is opened by flow pressure of the urea solution to supply the urea water into the casing 100.

Meanwhile, with reference to FIG. 6, the urea solution injection valve 220 includes: a valve casing 202*b* mounted at an inlet part thereof to an end of the urea solution injection pipe 200 and configured such that an outlet part 204*b* of the valve casing 202*b* is circumferentially opened; and a stopper 208*b* provided at the outlet part 204*b* of the valve casing 202*b* so as to normally close the outlet part 204*b* of the valve casing 202*b* by being elastically biased by a restoring spring 206*b*, and to open the outlet part 204*b* of the valve casing 202*b* when being forced by injection pressure of the urea solution.

This is a second embodiment of the urea solution injection valve 220. The valve casing 202*b* is mounted at the inlet part thereof to the end of the urea solution injection pipe 200 such that the outlet part 204*b* of the valve casing 202*b* is circumferentially opened so that the urea solution flows therethrough. The outlet part 204*b* of the valve casing 202*b* is opened and closed by the stopper 208*b* elastically biased by the restoring spring 206*b*.

Here, the outlet part 204*b* of the valve casing 202*b* is closed at an end thereof and is provided with a plurality of holes formed on a circumferential surface thereof at regular intervals so that the urea solution can flow therethrough. Meanwhile, the stopper 208*b* provided at the outlet part of the valve casing 100 is configured as a conical shape and is installed such that a conical surface thereof is directed towards the inlet part of the valve casing 202*b*. Thus, the stopper 208*b* can efficiently close the outlet part 204*b* of the valve casing 202*b*, and further can efficiently open the outlet part 204*b* of the valve casing 202*b* when being forced by flow pressure of the urea solution. Here, the stopper 208*b* is elastically biased in a direction closing the outlet part 204*b* of the valve casing 202*b* by the restoring spring 206*b* that is installed at an opposite side of the conical surface of the stopper 208*b*.

Hereinbelow, an operation according to embodiments of the present invention will be described.

With reference to FIG. 1, when the urea solution stored in the casing 100 is insufficient, the first extension part 240 of the urea solution injection pipe 200 is maintained at the predetermined angle of inclination, and the second extension part 280 that is connected to the first extension part 240 through the connection part 260 is kept bent in a downward direction by self weight of the urea solution injection valve 220 and the float 300.

With reference to FIG. 4, when the urea solution is injected into the casing 100 in this state, the connection part 260 and the second extension part 280 of the urea solution injection pipe 200 are straightened by flow pressure of the urea solution to meet the predetermined angle of inclination of the first extension part 240. Here, the float device 300 and the urea solution injection valve 220 that are installed on the second extension part 280 are maintained in a state of being immersed in the urea solution stored in the casing 100. Thus, the urea solution can be efficiently supplied into the casing 100.

In such a manner, when the casing 100 is sufficiently filled with the urea solution, injection of the urea solution is stopped. Accordingly, the float device 300 provided at the second extension part 280 is lifted by buoyancy acting thereon by the urea solution stored in the casing 100, and accordingly the connection part 260 is bent such that the urea solution injection valve 220 provided at the second extension part 280 is maintained in a state of being lifted above the surface of the urea solution without being immersed therein. Thus, the urea solution injection valve 220 can be prevented from being damaged upon freezing in the winter season.

In embodiments, referring to FIGS. 1 to 6, a urea supply pipe 200 includes a proximal portion 240, a distal portion 280 and a flexible portion 260 which are located inside a tank housing 100. The pipe 200 further includes a valve 220 attached to an end of the distal portion 280. The proximal portion 240 is inclined with respect to the horizontal plane such that the urea solution flows down along the inclined proximal portion when supplying the urea solution to the tank. The proximal portion 240 and the distal portion 280 are rigid. The flexible portion or connection portion 260 is more flexible than the proximal portion 240 and the distal portion 280. The flexible portion 260 deforms to allow the distal portion 280 to swing or rotate up and down about the flexible portion 260.

In embodiments, the pipe includes a float or air ball 340 attached to the distal portion 280 and floating in the urea solution contained in the tank to inhibit the valve 220 from being immersed into the urea solution when the urea solution is not being loaded. When loading the urea solution, the flow of the urea solution causes the distal portion 280 to extend downwardly and be inclined with respect to the horizontal plane such that the urea solution flows downwardly.

In embodiments, after loading the urea, the buoyancy of the float 340 in the urea solution pushes up the distal portion 280 to rotate up about the flexible portion 260 which deforms to allow such rotation. When the level of the urea solution goes down, the float 340 and the distal portion 280 go down by gravity and the flexible portion 260 deforms to allow such movement of the distal portion 280. When the float 340 floats in the urea solution, the distal portion 280 has one of a first, second and third orientations. The distal portion 280 extends downwardly from the flexible portion 260 in the first orientation, extends horizontally in the second orientation and extends upwardly from the flexible portion 260 in a third orientation. In one embodiment, the location of the float 340 relative to the flexible portion 260, the distal portion 280 and the valve 220 is determined such that, when the urea solution is not being loaded, the valve 220 attached to the distal portion 280 does not touch the urea solution in any one of the first, second and third orientations of the distal portion 280 as long as the float 340 touches the urea solution.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus of a urea tank for a vehicle, the apparatus comprising:
   a urea tank configured to store a urea solution therein;
   a urea supply pipe located inside the urea tank for receiving a supply of the urea solution from outside the urea tank, the urea supply pipe comprising a proximal portion, a distal portion and a deformable portion interconnecting the proximal portion and the distal portion therebetween, wherein the deformable portion is configured to deform such that the distal portion bends or unbends relative to the proximal portion; and
   a float mechanism comprising a float and a fixing member attached to the distal portion of the urea supply pipe such that, without regard to a level of the urea solution in the urea tank, the float stays under a point of the distal portion to which the fixing member is attached,
   wherein, when the urea solution is being supplied to the urea tank, the deformable portion is configured to deform for unbending the distal portion relative to the proximal portion such that the float submerges into the urea solution depending upon a level of the urea solution,
   wherein when the urea solution is not being supplied to the urea tank, the float is configured to lift the distal portion which causes deformation of the deformable portion such that the distal portion extends upwardly from the deformable portion above the level of the urea solution in the urea tank,
   wherein the distal portion comprises a valve,
   wherein a size of the float is determined such that when the urea solution is injected through the urea supply pipe, the float is configured to submerge into the urea solution by flow pressure of the urea solution being injected through the urea supply pipe,
   wherein the valve includes:
      a cylindrical valve body comprising an outlet; and
      a stopper positioned to face the outlet and elastically biased toward the outlet to close the outlet, wherein the stopper is configured to move away from the outlet to open the outlet when the urea solution is being supplied into the urea tank.

2. The apparatus of claim 1, wherein when the urea solution is being supplied to the urea tank, the deformable portion is configured to deform for unbending the distal portion relative to the proximal portion such that the urea supply pipe straightens up.

3. The apparatus of claim 1, wherein the proximal portion is fixed to at a fixing location of the urea tank and wherein the proximal portion extends downwardly from the fixing location with a fixed inclination angle.

4. The apparatus of claim 1, wherein the deformable portion comprises a plurality of wrinkles.

5. The apparatus of claim 1, wherein the valve includes:
   a valve housing comprising an opening; and
   a door coupled to the valve housing, wherein the door is configured to close and open the opening, and elastically biased toward the opening to close the opening.

6. The apparatus of claim 1, wherein the stopper is configured to close the outlet when the urea solution is not being supplied to the urea tank, wherein the cylindrical valve body comprises a plurality of holes formed on a circumferential surface thereof at regular intervals.

7. The apparatus of claim 1, wherein the stopper comprises a conical body having a conical surface facing the outlet.

* * * * *